(12) United States Patent
Kook et al.

(10) Patent No.: US 12,338,777 B2
(45) Date of Patent: Jun. 24, 2025

(54) HYDROGEN-DIESEL DIRECT INJECTION DUAL-FUEL SYSTEM FOR INTERNAL COMBUSTION ENGINES

(71) Applicant: NewSouth Innovations Pty Limited, Sydney (AU)

(72) Inventors: Sanghoon Kook, Sydney (AU); Bryce Edmonds, Sydney (AU); Xinyu Liu, Haymarket (AU)

(73) Assignee: NewSouth Innovations Pty Limited, Sydney (AU)

( * ) Notice: Subject to any disclaimer, the term of this patent is extended or adjusted under 35 U.S.C. 154(b) by 0 days.

(21) Appl. No.: 18/730,059

(22) PCT Filed: Jan. 16, 2023

(86) PCT No.: PCT/AU2023/050019
§ 371 (c)(1),
(2) Date: Jul. 18, 2024

(87) PCT Pub. No.: WO2023/137515
PCT Pub. Date: Jul. 27, 2023

(65) Prior Publication Data
US 2025/0116238 A1    Apr. 10, 2025

(30) Foreign Application Priority Data
Jan. 21, 2022   (AU) .................. 2022900118

(51) Int. Cl.
*F02B 3/00*  (2006.01)
*F02D 19/06*  (2006.01)

(52) U.S. Cl.
CPC ..... *F02D 19/0689* (2013.01); *F02D 19/0644* (2013.01); *F02D 19/066* (2013.01); *F02D 19/0692* (2013.01); *F02D 19/0694* (2013.01)

(58) Field of Classification Search
CPC ............ F02D 19/0644; F02D 19/0689; F02D 41/0027; F02D 19/0692; F02D 19/0694;
(Continued)

(56) References Cited

U.S. PATENT DOCUMENTS 5,085,176 A * 2/1992 Brinkley, III ........... F02B 43/10
123/3
7,891,579 B2  2/2011 Mashida et al.
(Continued)

FOREIGN PATENT DOCUMENTS

WO      2003027476 A2    4/2003
WO      2004042221 A2    5/2004

OTHER PUBLICATIONS

International Search Report filed in PCT/AU2023/050019 dated Feb. 16, 2023; 4 pages.

*Primary Examiner* — Long T Tran
*Assistant Examiner* — James J Kim
(74) *Attorney, Agent, or Firm* — Vedder Price P.C.

(57) ABSTRACT

A hydrogen-diesel direct injection dual-fuel system for an internal combustion engine enables retrofitting to existing diesel engines. The system comprises: a cylinder head of the engine having a first and a second injector hole; a diesel pilot injector positioned in the first injector hole; and a hydrogen injector positioned in the second injector hole; wherein the hydrogen injector comprises: a gasoline direct injector having an external shank and a distal output end; and a nozzle cap covering the distal output end, wherein the nozzle cap is welded to the external shank.

15 Claims, 3 Drawing Sheets

(58) Field of Classification Search
CPC .............. F02D 19/0642; F02D 19/066; F02D 41/0025; F02D 41/403
USPC ...................................................... 123/299
See application file for complete search history.

(56) References Cited

U.S. PATENT DOCUMENTS

| | | | |
|---|---|---|---|
| 8,794,212 B2* | 8/2014 | Klingbeil | F02D 41/0027 123/299 |
| 10,526,983 B2* | 1/2020 | Hill | F02D 13/0265 |
| 2003/0024246 A1* | 2/2003 | Beck | F02D 19/061 60/599 |
| 2004/0250797 A1* | 12/2004 | Shetley | F02D 19/066 123/527 |
| 2008/0098737 A1* | 5/2008 | Haggerty | F02C 7/22 60/740 |
| 2011/0010074 A1* | 1/2011 | Hung | F02D 41/3035 123/295 |
| 2014/0238340 A1* | 8/2014 | Dunn | F02D 19/0642 123/299 |
| 2018/0328326 A1 | 11/2018 | Pfefferle et al. | |

* cited by examiner

HYDROGEN-DIESEL DIRECT INJECTION DUAL-FUEL SYSTEM FOR INTERNAL COMBUSTION ENGINES

FIELD OF THE INVENTION

The present invention relates generally to a system for direct injection of hydrogen into a combustion chamber, and in particular but not exclusively to a system for retrofitting a conventional diesel engine to a dual-fuel engine.

BACKGROUND

As reported in the International Journal of Hydrogen Energy, "[t]he hydrogen-fueled internal combustion engine ($H_2ICE$) is an attractive energy conversion technology with a broad range of benefits including high thermodynamic efficiency, straightforward conversion of existing petroleum- and gas-fueled engines as well as existing engineering and manufacturing infrastructure. The successful development of $H_2ICE$ will make a significant impact on propulsion and stationary applications, thereby accelerating the market penetration of hydrogen as a future energy carrier." International Journal of Hydrogen Energy 46 (2021) pg. 1303.

Hydrogen dual-fuel engine architectures appear to be very promising, where a small quantity of diesel pilot fuel is injected into an engine combustion chamber simultaneously with a hydrogen fuel injection. However, a significant technical problem concerning further research and commercialisation of dual-fuel concepts is a lack of commercially available hydrogen fuel injection systems that are effective in a dual-fuel engine environment.

In particular, prior art hydrogen fuel injection systems have been susceptible to hydrogen leaking from injectors, and such prior art systems have not successfully managed the relatively high hydrogen gas pressures required for direct hydrogen injection into the cylinder in an effective dual-fuel engine.

There is therefore a need for an improved hydrogen-diesel direct injection dual-fuel system for internal combustion engines.

OBJECT OF THE INVENTION

It is an object of the present invention to overcome and/or alleviate one or more of the disadvantages of the prior art or provide the consumer with a useful or commercial choice.

SUMMARY OF THE INVENTION

In a first aspect, although it need not be the only or the broadest aspect, the invention resides in a hydrogen-diesel direct injection dual-fuel system for an internal combustion engine. The system includes:
- a cylinder head of the engine having a first and a second injector hole;
- a diesel pilot injector positioned in the first injector hole; and
- a hydrogen injector positioned in the second injector hole; wherein the hydrogen injector comprises:
  - a gasoline direct injector having an external shank and a distal output end; and
  - a nozzle cap covering the distal output end, wherein the nozzle cap is welded to the external shank.

Preferably, a distal end of the nozzle cap comprises a Teflon seal.

Preferably, the nozzle cap comprises an o-ring seal.

Preferably, access is provided to a rear end of the gasoline direct injector using a lubrication feed adapter for receiving a lubricant.

Preferably, the diesel pilot injector is centrally mounted on the cylinder head and a longitudinal axis of the hydrogen injector extends towards the centre of the cylinder.

Preferably, the system further includes an engine controller programmed to inject diesel fuel through the diesel pilot injector into a hydrogen charge injected from the hydrogen injector.

Preferably, the system further includes an engine controller programmed to inject diesel fuel through the diesel pilot injector before or after injecting a hydrogen charge from the hydrogen injector, whereby the hydrogen charge is injected into diesel flames to generate hydrogen diffusion flames, or the diesel flames develop within a partially premixed hydrogen charge.

Preferably, the controller is programmable to adjust injection timing and dwell time of both the diesel pilot injector and the hydrogen injector.

Preferably, the gasoline direct injector is a multi-hole spray-guided injector.

Preferably, the nozzle cap defines an annular flow region that merges with a single output hole.

The system of claim 1, wherein the nozzle cap comprises a single output hole that is approximately 1 mm in diameter.

Preferably, the system further includes a hydrogen boost pump that supplies hydrogen to the hydrogen injector at a pressure of at least 20 MPa.

Preferably, the hydrogen injector is lubricated with oil or diesel fuel.

Preferably, the nozzle cap comprises stainless steel.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

DETAILED DESCRIPTION OF THE PREFERRED EMBODIMENT

Figure 1:
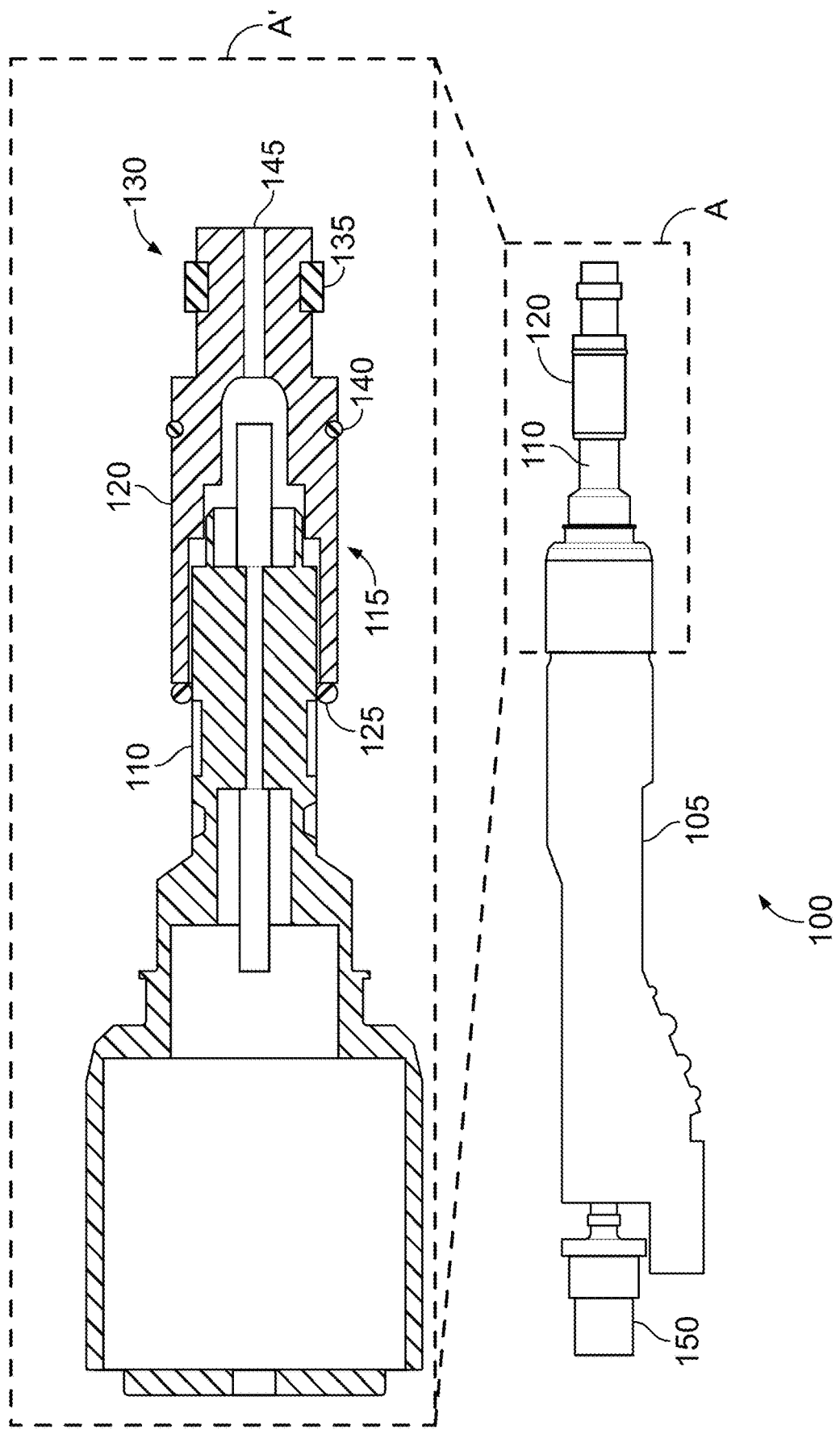
FIG. 1 is a schematic diagram of a hydrogen injector, according to an embodiment of the present invention.

The present invention relates to a hydrogen direct injection system for an internal combustion engine. Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, above and below, top and bottom, upper and lower, rises and falls, upward and downward, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

According to one aspect, the present invention is defined as a hydrogen direct injection system for an internal combustion engine, the system comprising:
- a cylinder head of the engine having a first and a second injector hole;
- a diesel pilot injector positioned in the first injector hole; and
- a hydrogen injector positioned in the second injector hole; wherein the hydrogen injector comprises:
  - a gasoline direct injector having an external shank and a distal output end; and
  - a nozzle cap covering the distal output end, wherein the nozzle cap is welded to the external shank.

Advantages of some embodiments of the present invention include providing a system that can be readily retrofitted to existing diesel engines. An improved nozzle cap enables leak-proof coupling to commercial gasoline direct injectors. Further, an engine controller is programmable to adjust injection timing and dwell time of both the diesel pilot injector and the hydrogen injector, independently. That enables ready experimental tuning of engine efficiency and emissions levels, including substantial $CO_2$ emission reductions.

Further, some embodiments of the present invention achieve up to a 90% hydrogen energy fraction as a main fuel, and 10% diesel pilot injection as an ignition source. That marks a substantial improvement from conventional port injection hydrogen-diesel dual-fuel engines which have a limited hydrogen energy fraction of up to only about 40%. With higher engine efficiency achieved than a diesel engine baseline, embodiments of the present invention also may be superior to conventional hydrogen spark ignition engines running on lower compression ratios. In addition, some embodiments of the present invention may achieve over 70% $CO_2$ reduction, and include retrofitting applications of many existing diesel engines Those skilled in the art will appreciate that not all of the above advantages are necessarily included in all embodiments of the present invention.

FIG. 1 is a schematic diagram of a hydrogen injector 100, according to an embodiment of the present invention. The hydrogen injector 100 includes a gasoline direct injector 105 having an external shank 110 and a distal output end 115. A close up cross-sectional view of the elements of box A shown in dashed lines in FIG. 1 is provided in box A'.

A nozzle cap 120 covers the distal output end 115. The nozzle cap 120 is generally cylindrical and is fitted over the external shank 110 of the gasoline direct injector 105. An annular weld 125 locks the nozzle cap 120 to the shank 110, and also reliably seals any gap between the nozzle cap 120 and the shank 110.

The nozzle cap 120 can be made of various stainless steel alloys or other alloys.

A distal end 130 of the nozzle cap 120 includes an annular Teflon seal 135. Also, an o-ring 140 is fitted around a mid-section of the nozzle cap 120. When assembled in a cylinder head of an internal combustion engine, the Teflon seal 135 and o-ring 140 enable the nozzle cap 120, with the gasoline direct injector 105 attached, to be snuggly fit and sealed in a through-hole of the engine cylinder head.

The gasoline direct injector 105 can be, for example, a commercially available multi-hole spray-guided gasoline direct injector, such as those manufactured by Robert Bosch GmbH under part no. GDI 0261500533. In the present embodiment, the original six 0.16 mm output holes are merged in the hydrogen injector 100 into a single 1.0 mm output hole 145.

When operating as an element of the hydrogen injector 100, the gasoline direct injector 105 generally requires lubrication to ensure that the internal needle of the injector 105 does not fail. When the injector 105 is used in a gasoline powered engine, the gasoline fuel acts as an excellent lubricant and thus the injector 105 can be used without additional lubrication. However, in the hydrogen injector 100 of the present invention, gaseous hydrogen flowing through the injector 105 may not provide adequate lubrication. Therefore, in the injector 100, access is provided to a rear end of the gasoline direct injector 105 using a lubrication feed adapter 150 for receiving a lubricant. According to some embodiments, daily feeding of a drop of engine oil into the adapter 150 can be adequate; alternatively, in other embodiments the adapter 150 can be automated to provide a regular injection of lubrication, such as diesel fuel, into the injector 105.

Figure 2:
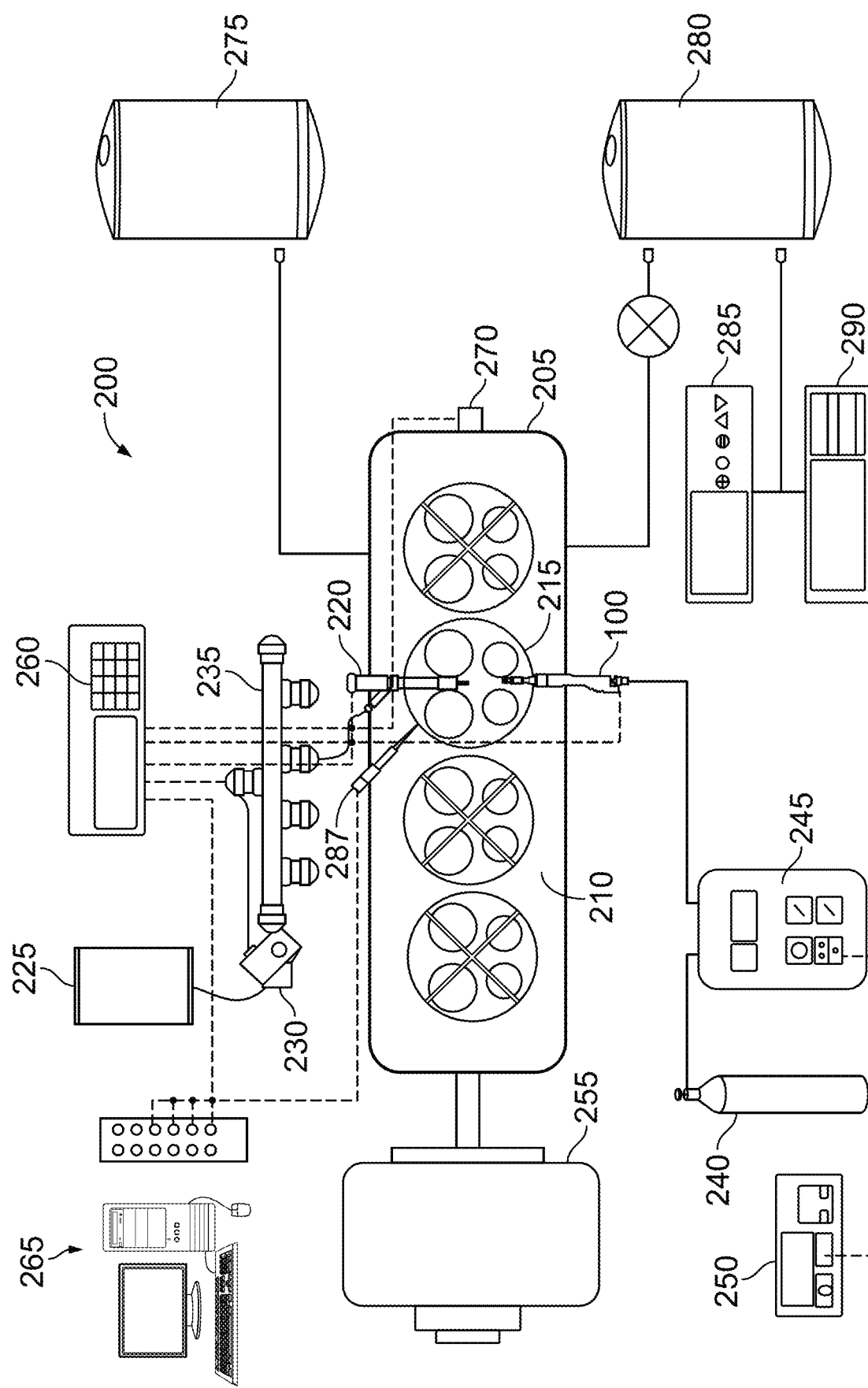
FIG. 2 is a schematic diagram of a hydrogen-diesel direct injection dual-fuel test rig system for an internal combustion engine, according to an embodiment of the present invention.

FIG. 2 is a schematic diagram of a hydrogen-diesel direct injection dual-fuel test rig system 200 for an internal combustion engine, according to an embodiment of the present invention. The system 200 is arranged as a testing rig of a single-cylinder common-rail diesel engine 205, using a modified in line four-cylinder production diesel engine. The system 200 includes an engine cylinder head 210, the hydrogen injector 100, as described above, positioned in the cylinder head 210 to provide hydrogen fuel to an active cylinder 215 of the engine 205. A diesel pilot injector 220 is also positioned in the cylinder head 210.

A diesel tank 225 provides diesel fuel to a conventional high-pressure common-rail pump 230, which provides 100 MPa or higher injection pressure to a common rail 235 connected to the diesel pilot injector 220.

A low-pressure hydrogen tank 240 provides hydrogen gas to a hydrogen boost pump 245, which provides 20 MPa injection pressure to the hydrogen injector 100. A boost pump controller 250 enables effective and efficient control of the operating parameters of the hydrogen boost pump 245. Further, in the test rig system 200, a substantial accumulator, for example with a volume of 1000 cm$^3$, of the hydrogen boost pump 245 enables hydrogen supply to be provided by the low-pressure hydrogen tank 240 (for example, a 13.7 MPa G-size bottle).

The relatively high pressure operation, at 20 MPa, of the hydrogen boost pump 245 is important for effective hydrogen direct injection by the hydrogen injector 100. Those having ordinary skill in the art will appreciate that a "choked flow" theory suggests that injection pressure must be at least twice higher than a given back pressure to avoid a problematic influence of back pressure in the active cylinder 215 on the hydrogen gas flow rate. Typically, the compression pressure of diesel engines at top dead centre (TDC) does not exceed 10 MPa, and thus the hydrogen injector 100 as described herein satisfies the requirements of the choked flow theory.

A dynamometer 255 is connected to the crank shaft of the engine 205, and is used to control engine speed and load conditions. An engine controller 260 controls general engine operating conditions, and is connected to a data acquisition system 265. A pressure transducer 267 is connected to the active cylinder 215 and provides in-cylinder pressure data to the data acquisition system 265, which data can be used to calculate the apparent heat release rate (aHRR) and indicated engine efficiency. A rotary encoder 270 measures position and motion of the engine crank shaft, which information is provided to the engine controller 260.

An intake surge tank 275 is connected to an intake manifold of the engine 205, and an exhaust surge tank 280 is connected to an exhaust manifold of the engine 205. Engine-out emissions of $NO_x$ (NO and $NO_2$) are measured using a non-dispersive infrared (NDIR) analyser 285, while carbon dioxide ($CO_2$) emissions are measure using another NDIR gas analyser 290.

Figure 3:
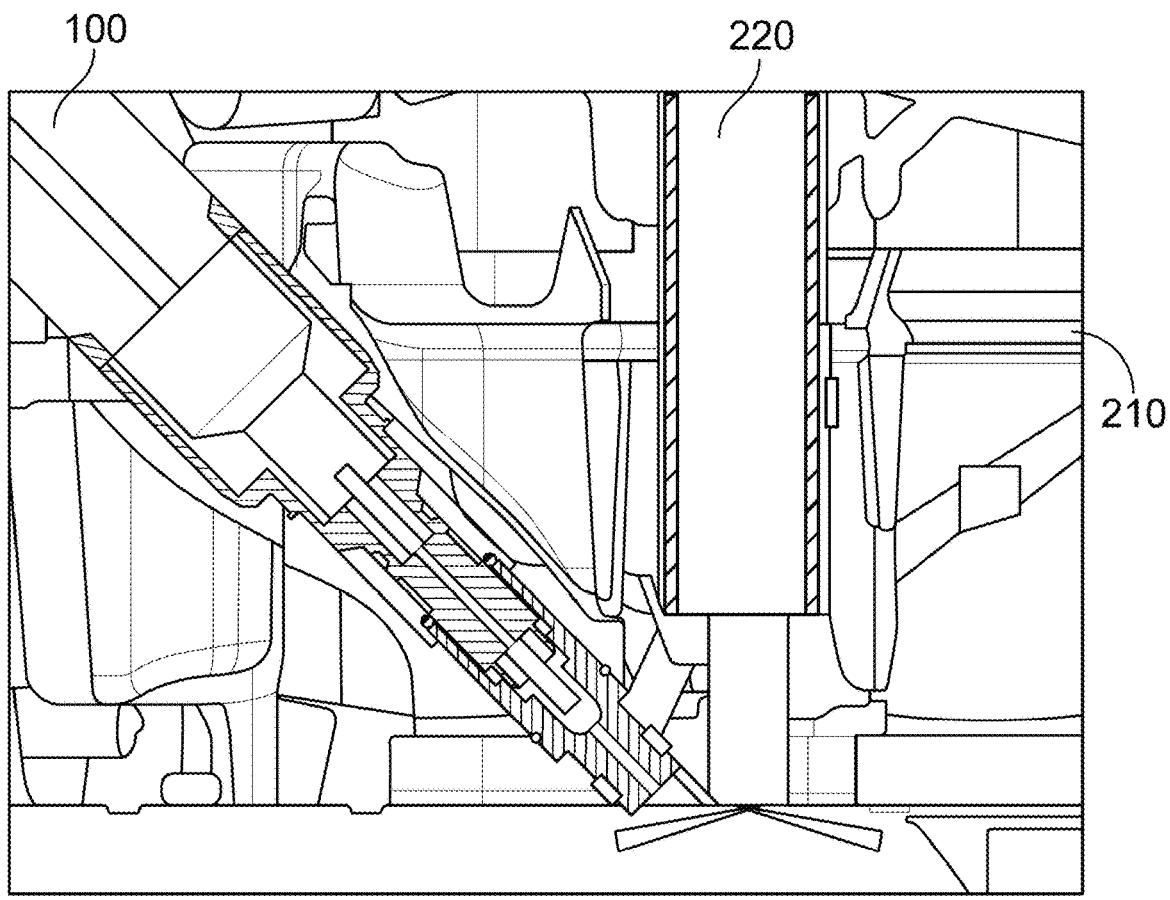
FIG. 3 is a cross-sectional side view of a portion of the engine cylinder head shown in FIG. 2, according to an embodiment of the present invention.

FIG. 3 is a cross-sectional side view of a portion of the engine cylinder head 210, according to an embodiment of the present invention. To minimise modification of the commercial cylinder head, the hydrogen injector 100 is shown positioned in an original glow plug hole of the cylinder head 210, and as shown a longitudinal axis of the hydrogen injectors extends towards the centre of the cylinder to effectively form a hydrogen charge away from the wall. The diesel pilot injector 220 is also positioned in the cylinder head 210, and is centrally mounted as in most commercial diesel engines.

Figure 4:
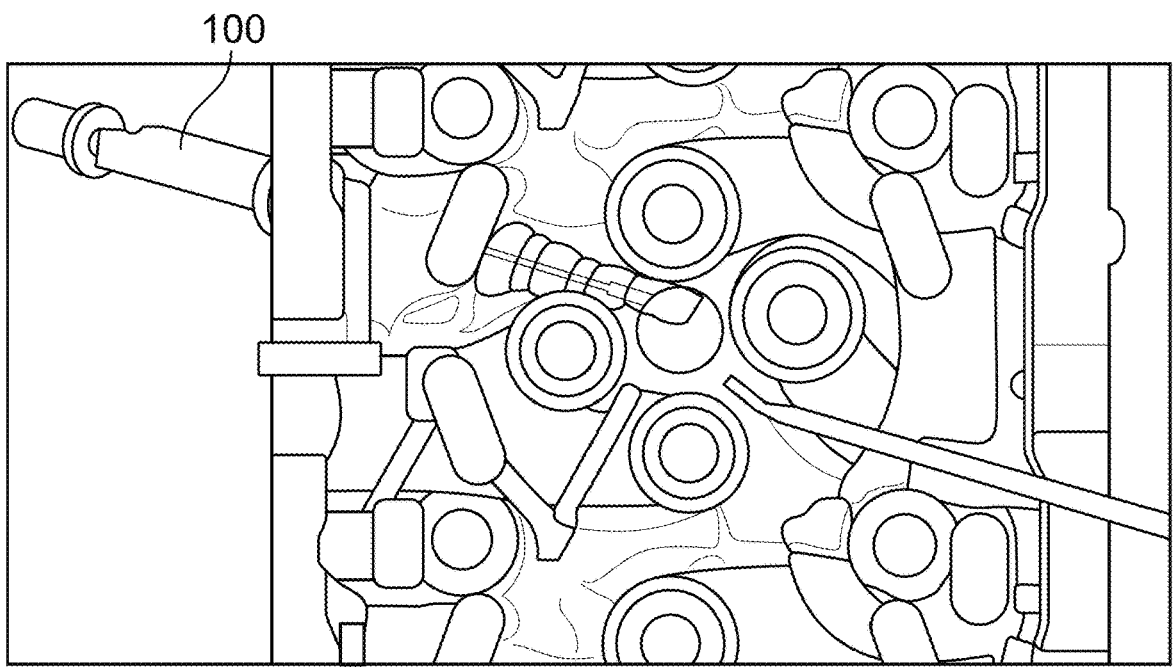
FIG. 4 is a bottom view of a portion of the engine cylinder head of FIG. 2 covering the illustrated active cylinder, according to an embodiment of the present invention.

FIG. 4 is a bottom view of a portion of the engine cylinder head 210 covering the active cylinder 215, according to an embodiment of the present invention. This view illustrates the relative positioning of intake valves, exhaust valves, water jackets, the hydrogen injector 100, the diesel pilot injector 220, and the pressure transducer 267.

Those skilled in the art will appreciate that the present invention can be implemented on various types of diesel engines, and may immediately provide substantial benefits for test rigs of hydrogen-diesel direct injection dual-fuel systems for internal combustion engines.

The above description of various embodiments of the present invention is provided for purposes of description to one of ordinary skill in the related art. It is not intended to be exhaustive or to limit the invention to a single disclosed embodiment. Numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A hydrogen-diesel direct injection dual-fuel system for an internal combustion engine, the system comprising:
a cylinder head of the engine having a first and a second injector hole;
a diesel pilot injector positioned in the first injector hole; and
a hydrogen injector positioned in the second injector hole;
wherein the hydrogen injector comprises:
a gasoline direct injector having an external shank and a distal output end; and
a nozzle cap covering the distal output end, wherein the nozzle cap is welded to the external shank.

2. The system of claim 1, wherein a distal end of the nozzle cap comprises a Teflon seal.

3. The system of claim 1, wherein the nozzle cap comprises an o-ring seal.

4. The system of claim 1, wherein access is provided to a rear end of the gasoline direct injector using a lubrication feed adapter for receiving a lubricant.

5. The system of claim 1, wherein the diesel pilot injector is centrally mounted on the cylinder head and a longitudinal axis of the hydrogen injector extends towards the centre of the cylinder.

6. The system of claim 1, further comprising an engine controller programmed to inject diesel fuel through the diesel pilot injector into a hydrogen charge injected from the hydrogen injector.

7. The system of claim 1, further comprising an engine controller programmed to inject diesel fuel through the diesel pilot injector before or after injecting a hydrogen charge from the hydrogen injector, whereby the hydrogen charge is injected into diesel flames to generate hydrogen diffusion flames, or the diesel flames develop within a partially premixed hydrogen charge.

8. The system of claim 6, wherein the controller is programmable to adjust injection timing and dwell time of both the diesel pilot injector and the hydrogen injector.

9. The system of claim 1, wherein the gasoline direct injector is a multi-hole spray-guided injector.

10. The system of claim 9, wherein the nozzle cap defines an annular flow region that merges with a single output hole.

11. The system of claim 1, wherein the nozzle cap comprises a single output hole that is approximately 1 mm in diameter.

12. The system of claim 1, further comprising a hydrogen boost pump that supplies hydrogen to the hydrogen injector at a pressure of at least 20 MPa.

13. The system of claim 1, wherein the hydrogen injector is lubricated with oil or diesel fuel.

14. The system of claim 1, wherein the nozzle cap comprises stainless steel.

15. The system of claim 7, wherein the controller is programmable to adjust injection timing and dwell time of both the diesel pilot injector and the hydrogen injector.

* * * * *